United States Patent [19]

Mendenhall

[11] Patent Number: 4,790,546
[45] Date of Patent: Dec. 13, 1988

[54] TOY TRACKED VEHICLE

[76] Inventor: Charles A. Mendenhall, 309 Buck Hill Rd., Rochester, Monroe County, N.Y. 14626

[21] Appl. No.: 181,032

[22] Filed: Apr. 13, 1988

[51] Int. Cl.[4] .............................................. B62K 5/06
[52] U.S. Cl. ............................. 280/1.11 R; 180/9.25; 180/9.36; 180/9.38; 280/210; 280/282
[58] Field of Search .................. 280/282, 1.11 R, 211, 280/229, 210; 180/6.7, 9, 9.1, 9.3, 9.25, 9.34, 9.36, 9.38

[56] References Cited

U.S. PATENT DOCUMENTS

| | | | |
|---|---|---|---|
| 654,291 | 7/1900 | Stith | 180/9.25 X |
| 1,153,112 | 9/1915 | Johnson | 180/9.34 |
| 1,302,358 | 4/1919 | Garami | 280/1.11 R |
| 1,376,347 | 4/1921 | McComb | 280/1.11 |
| 1,590,696 | 6/1926 | Orr | 280/1.11 RX |
| 2,107,072 | 2/1938 | Herrington | 180/9.38 X |
| 2,289,331 | 7/1942 | Alt | 280/1.11 R |
| 2,305,072 | 12/1942 | Fetters | 280/211 |
| 2,310,775 | 2/1943 | Gavagnin | 180/9.34 |
| 3,194,583 | 7/1965 | Nottage | 280/229 |
| 3,347,557 | 10/1967 | Cruson | 280/1.11 |

FOREIGN PATENT DOCUMENTS

| | | | |
|---|---|---|---|
| 682282 | 9/1939 | Fed. Rep. of Germany | 180/9.34 |
| 25182 | 1/1923 | France | 180/9.36 |

Primary Examiner—David M. Mitchell
Assistant Examiner—Charles R. Watts
Attorney, Agent, or Firm—Marjama & Pincelli

[57] ABSTRACT

A toy in the form of a tracked vehicle containing a pair of tracks which turn in a manner which simulates a full-sized tracked vehicle, the vehicle having a supporting frame, a tricycle device mounted on the frame, the tricycle device having a pedal actuated drive wheel mounted at the forward end of the frame and a pair of auxiliary wheels in parallel relationship to each other mounted at the opposite end of the frame, a steering device connected to the drive wheel for turning the tricycle device in any direction thereby controlling the direction of the tracked vehicle, and idler devices mounted on the frame associated with each auxiliary wheel and positioned forward of the auxiliary wheels, each of the tracks being affixed respectively to one of the auxiliary wheels and the associated idler devices to allow for track movement in response to movement of the auxiliary wheels, the idler devices being positioned to maintain the tracks out of contact with the riding surface of the vehicle at the forward end of the frame.

11 Claims, 3 Drawing Sheets

4,790,546

TOY TRACKED VEHICLE

BACKGROUND OF THE INVENTION

Toys, such as tracked vehicles, have long been sold and enjoyed by children. A tracked vehicle which a child may ride on however, generally involves a complex mechanism where the track engages the riding surface and propels the vehicle. Such vehicles besides being quite complex are also expensive to manufacture. U.S. Pat. No. 2,305,072 illustrates a tracked toy of this type. Where an attempt is made to make a simpler, less complex toy and simulate the tracks with a decal or by painting a track on an outer body, the vehicle will be simple and less expensive to manufacture than an actual tracked vehicle, but does not actually simulate real track movement and therefore, loses a good deal of appeal to a child. U.S. Pat. No. 3,347,557 illustrates a toy of this type.

There has, therefore, been a need in the field of toys for a simple, inexpensive tracked vehicle which simulates actual track movement, which can be made inexpensively, and is easily driven and controlled by a child.

SUMMARY OF THE INVENTION

The present invention is directed to a child's toy in the form of a tracked vehicle which contains a pair of tracks which turn in a manner which simulates track movement of a real full size tracked vehicle. The vehicle is preferably driven by tricycle means which include a frame, a pedal actuated drive wheel and a pair of rear auxiliary wheels both of which are supported by the frame. The vehicle further includes steering means connected to the drive wheel and adapted for turning the tricycle means in the desired direction thereby controlling the direction of travel of the tracked vehicle. The pair of tracks are affixed to the rear auxiliary wheels and a pair of idler means disposed longitudinally from the rear auxiliary wheels which allows for track movement in response to movement of the auxiliary wheels. Optionally, the vehicle may contain an outer body which is secured to the frame and which surrounds the tricycle means. The outer body may simulate any desired type of vehicle, preferably a tracked vehicle such as a tank or tractor. In order to allow for free movement of the vehicle, the idler means are positioned so as to maintain the tracks out of contact with the riding surface of the vehicle toward the drive wheel end of the frame. The vehicle further contains a riding seat which may be positioned at any convenient location on the frame. The vehicle of the present invention allows for the simulation of a tracked vehicle while still maintaining the ease of operation of a tricycle type vehicle.

DETAILED DESCRIPTION OF THE INVENTION

Figure 1:
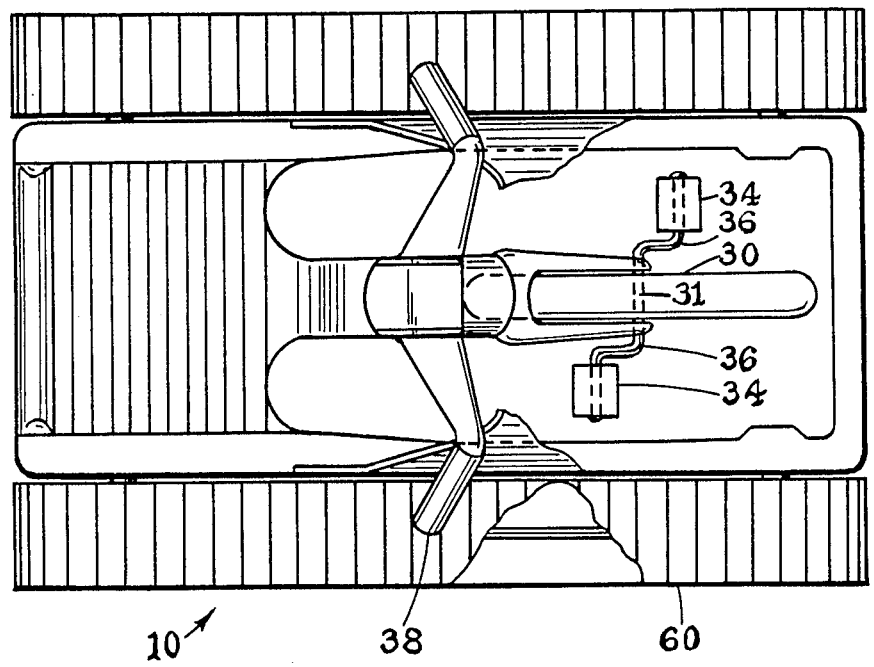
FIG. 1 is a top view of a vehicle made in accordance with the present invention.
Figure 2:
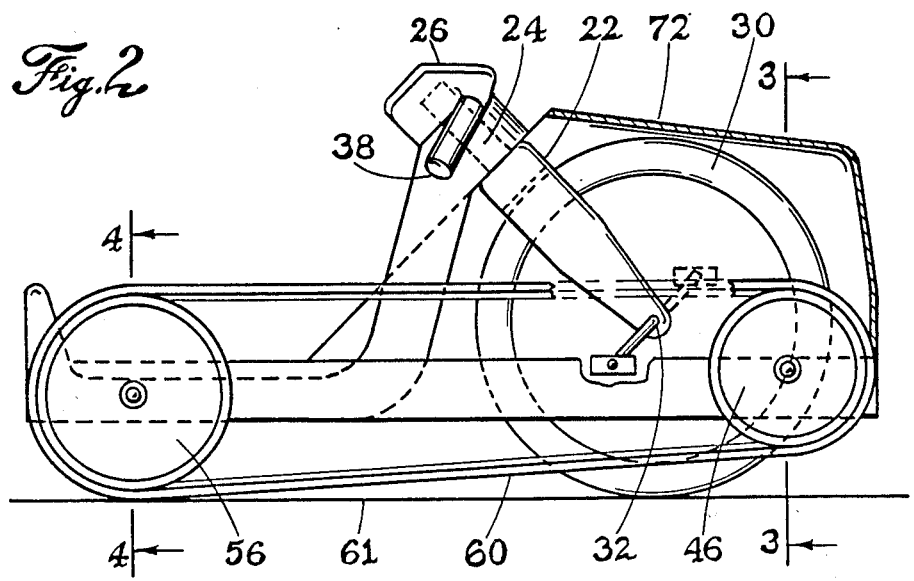
FIG. 2 is a side view, partially broken and sectioned, of the vehicle of FIG. 1.

Referring to FIGS. 1 through 5, there is illustrated a toy tracked vehicle 10 made in accordance with the present invention. Vehicle 10 is provided with a tricycle support frame 12 (see FIG. 5). The frame 12 includes a continuous outer support structure 14 and an inner support structure 16 disposed within the periphery of outer support structure. This inner support structure 16 has an upper end 18 having an opening 20 (shown in phantom). Preferably, frame 12 is a single integrally formed part made of relative hard plastic.

The upper end 18 of inner support structure 16 supports a drive assembly which comprises a drive wheel fork 22, steering means 26 and drive wheel 30. Drive wheel fork 22 has a journaled shaft 24 which is designed to pass through opening 20 of upper end 18 and is free to rotate about its longitudinal axis in response to movement of the steering means. The lower end of drive wheel fork 22 is divided into a pair of fork side members 28, with each fork side member having an opening 32 for mounting wheel 30. Wheel 30 is disposed between side members 28 and has a pair of pedals 34 secured to the wheel at its center. The pedals 34 each have a drive shaft 36 which pass through openings 32 of fork side members and through hole 31 through the center of wheel 30. In the particular embodiment illustrated, the shaft 36 and both pedals 34 are integrally formed and extend through openings 32 and hole 31. It should be understood that various modifications may be made to the lower end of the fork side members 28 to accommodate any means desired for mounting wheel 30 to said side members.

The upper end of journaled shaft 24 is secured to steering means 26 which turns wheel 30. In the particular embodiment illustrated in FIGS. 1-5, steering means 26 comprise a pair of handlebars 38. Handlebars 38 may be secured to upper end of journaled shaft 24 in any desired manner. In the particular embodiment illustrated, the handlebars 38 are secured by a press fit with journaled shaft 24. The drive assembly is mounted in such a manner that it can freely rotate in any direction typical of tricycle vehicles of the prior art.

Figure 4:
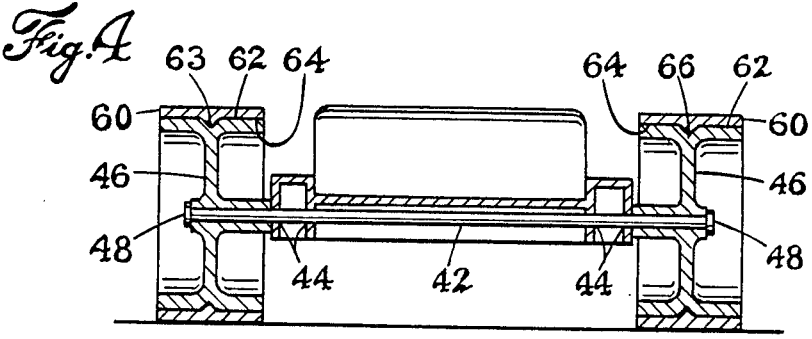
FIG. 4 is a sectional view through line 4—4 of FIG. 2.
Figure 5:
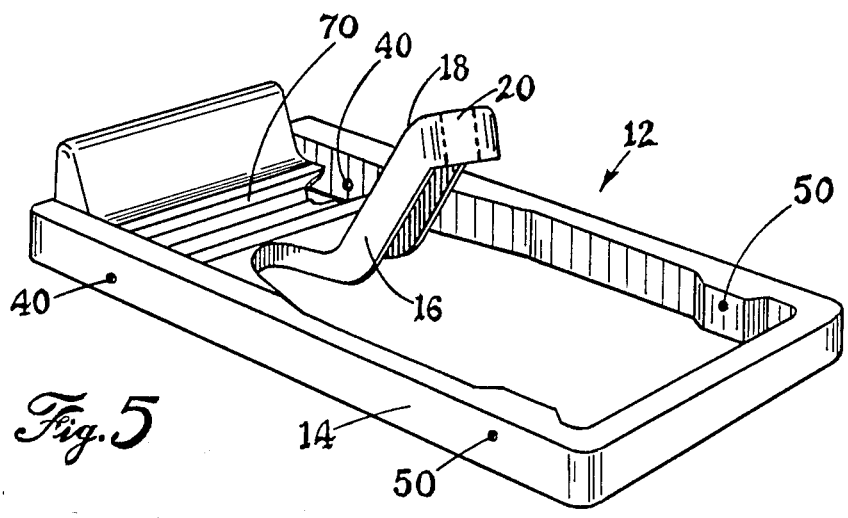
FIG. 5 is a perspective view of a support frame for the vehicle of the present invention.

The rearward section of frame 12 is provided with axial openings 40 which provide support for axle 42 which passes therethrough. As can be seen in FIG. 4, the frame 12 supports the axle at four locations 44, however, frame 12 may support axle 42 in any desired number of locations. A pair of wheels 46 are provided at each end of axle 42, and are secured to the axle by locking end caps 48. The wheels 46 are designed such that they freely rotate about axle 42.

Figure 3:
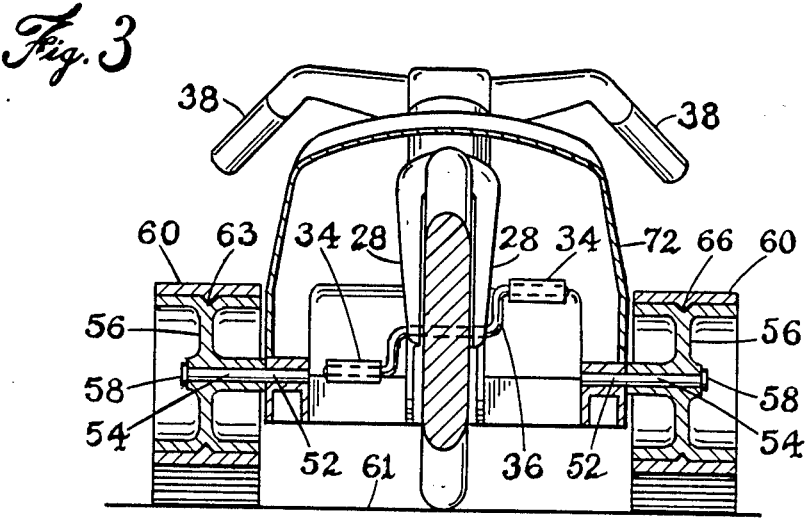
FIG. 3 is a front sectional view through line 3—3 of FIG. 2.

As shown in FIG. 3, the forward end of frame 12 is provided with a pair of idler pins 52 which are press fitted in openings 50 of frame 12. In the particular embodiment illustrated, idler pins 52 are permanently embedded in frame 12, however, if desired, the pin may simply rotate within an opening in frame 12. The pins 52 each have a mounting portion 54 that extends axially outwardly of frame 12. An idler wheel 56 is placed on mounting portion 54 of pin 52 such that the idler wheel 56 can freely rotate about the idler pin 52. An end cap 58 is provided on the end of each pin 52 for securing wheels 56 onto pins 52.

A continuous track 60 is mounted on idler wheel 56 and its associated rear wheel 46 on each side of frame 12. The track 60 may be made of any suitable material, such as an elastomer. The outer surface 62 of wheels 46 are designed so as to engage with the inner surface 64 of track 60 such that a sufficient amount of traction is transferred therebetween so as to cause the tracks 60 to move in response to rotation of the wheels 46. The idler pins 52 are located longitudinally forward of rear wheels 46 and at a position such that the track 60 as it leaves idler wheel 56 does not touch the riding surface 61 of the vehicle. In the particular embodiment illustrated, the outer edges of wheels 46 and 56 respectively are provided with an aligning groove 66 which receive projection 63 which is molded into the inner surface of the track and serves to hold the track in place.

Alternatively, the tracks used in the present invention may be made of any convenient material, such as a stretchable elastomeric material in which the tracks are fitted over the rear wheels and idler wheels and maintained in place through the elastic forces applied against said wheels. Alternatively, the tracks may be made of a less flexible or rigid material, such as plastic or a rubberized material, and may be maintained in place by any suitable mechanical means, such as grooves, slots or ridges which coact or mesh with reciprocal structure contained on the respective mounting wheels.

The rear portion of frame 12 is provided with a seat 70 to accommodate the operator of the vehicle. In the particular embodiment illustrated, the seat 70 is shown as being integrally formed as part of frame 12. However, if desired, the seat may comprise a separate component which may be mounted on frame 12 in any convenient manner.

In the particular embodiment illustrated, the vehicle 10 is optionally provided with an outer body 72 which is secured to frame 12 in any desired manner, such as by screws. The frame is designed such that an individual can easily sit on seat 70 and place his or her legs within body 72. The outer surface of body 72 may be provided with an appropriate design (not shown), preferably that of a tracked vehicle such as a tank or tractor.

In operating the vehicle of the present invention, an individual sits on seat 70 and places his legs on both sides of inner support structure 16 and turns the drive wheel 30 by movement of pedals 34. The operator places his hands on the handlebar 38 which allows the operator to steer the vehicle in any desired direction. When the vehicle moves, drive wheel 30 rotates which in turn causes the tracks 60 to rotate about rear wheels 46. Movement of track 60 in turn causes idler wheels 56 to rotate about idler pins 52. As the vehicle is moved, it will provide a simulation of a track movement, with the ease of movement of a tricycle, due to the tracks being out of contact with the riding surface of the vehicle at its front end.

The materials used to construct the device of the present invention with regard to most of the component parts, are preferably plastic, although light weight metals may also be used as desired. Other less desirable but inexpensive materials such as wood and pressed paper board may also be used for certain component parts.

Figure 6:
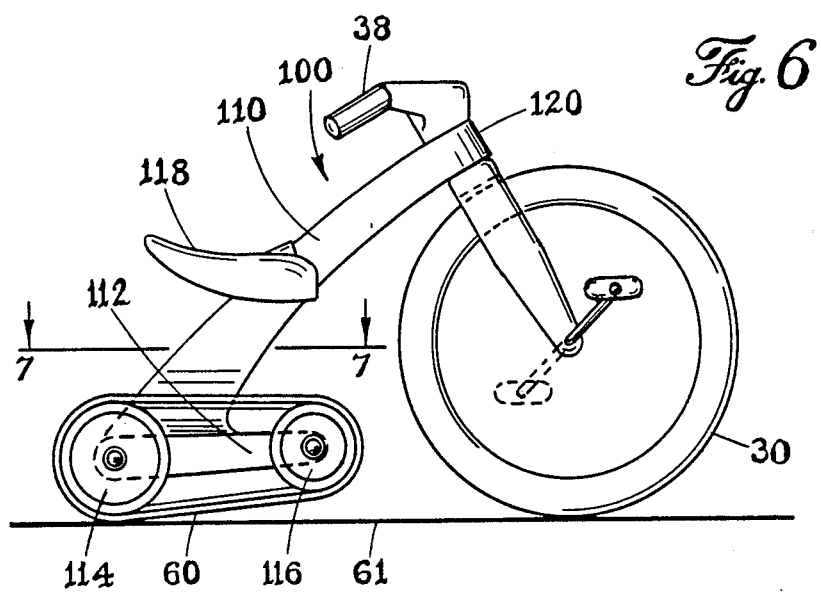
FIG. 6 is a side view of a second embodiment of a device of the present invention.
Figure 7:
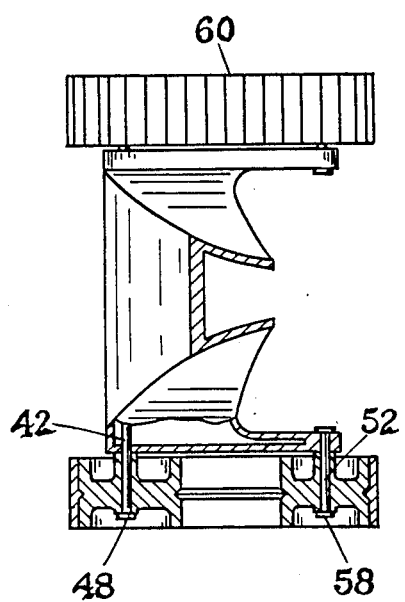
FIG. 7 is a sectional view through line 7—7 of FIG. 6.

Referring to FIGS. 6 and 7, there is illustrated a further embodiment of a vehicle 100 made in accordance with the present invention. In this embodiment like numerals have been placed to indicate identical parts as illustrated in FIGS. 1 through 5. In this embodiment, a frame 110 is provided having a lower end 112 having a pair of rear wheels 114 secured thereto in the same manner as wheels 46. A pair of idler wheels 116 are secured to the frame by idler pins 52. A track 60 is provided between associated rear wheels 114 and idler wheels 116. The frame 110 is further provided with a seat 118 secured thereto in any desired manner. The upper end 120 of frame 110 is provided with a drive wheel assembly identical to that illustrated in FIGS. 1 through 5. In this embodiment, as in the embodiment illustrated in FIGS. 1 through 5, the idler wheels 116 are designed and located such that the forward end of the track as it leaves the rear wheel does not typically engage the riding surface 61 of the vehicle directly below.

Although the present invention has illustrated a tricycle as being a preferred means for driving the tracked vehicle, it should be understood that other mechanisms, such as four-wheeled means, may also be used. Any convenient four-wheeled mechanism may be used, such as those found in pedal driven toy four-wheeled automobiles, etc.

In addition to the above, as an alternative to a pedal driven device, it should be understood that the device of the present invention may also be motor driven, such as through the use of batteries. It should also be understood that in alternative embodiments of this type, that the drive wheel or wheels, as the case may be, may optionally be in the rear or front as desired.

Although particular embodiments of the present invention have been disclosed herein for purposes of explanation, further modifications or variations thereof will be apparent to those skilled in the art to which this invention pertains.

I claim:

1. A toy in the form of a tracked vehicle containing a pair of tracks which turn in a manner which simulates a full-sized tracked vehicle, said vehicle having a supporting frame, tricycle means mounted on said frame, said tricycle means having a pedal actuated drive wheel mounted at the forward end of said frame and a pair of auxiliary wheels in parallel relationship to each other mounted at the opposite end of said frame, steering means connected to said drive wheel for turning said tricycle means in any direction thereby controlling the direction of said tracked vehicle, and idler means mounted on said frame associated with each auxiliary wheel and positioned forward of said auxiliary wheels, each of said tracks being affixed respectively to one of said auxiliary wheels and said associated idler means to allow for track movement in response to movement of said auxiliary wheels, said idler means being positioned to maintain said tracks out of contact with the riding surface of said vehicle at the forward end of said frame.

2. The device of claim 1 in which said idler means comprise a pair of wheels mounted on the opposite sides of said frame.

3. The device of claim 1 which further includes a riding seat on said frame.

4. A toy in the form of a tracked vehicle which comprises an outer body associated with a pair of tracks which turn in a manner which simulates a full-sized tracked vehicle, said outer body being secured to a frame which is contained at least partially within said outer body, tricycle means mounted on said frame, said tricycle means having a pedal actuated drive wheel located at one end of said frame and a pair of auxiliary wheels in parallel relationship to each other located at the opposite end of said frame, steering means connected to said drive wheel and being adapted for turning said tricycle means in any direction, thereby controlling the direction of said tracked vehicle, and idler means mounted on said frame forward of said auxiliary wheels, with said tracks being affixed respectively to each of said auxiliary wheels and said idler means to allow for track movement in response to movement of said auxiliary wheels, with said idler means being positioned to maintain said tracks out of contact with the riding surface of said vehicle at the track end opposite the auxiliary wheels.

5. The device of claim 4 in which said idler means comprise a pair of wheels mounted on the opposite sides of said frame.

6. The device of claim 4 which further includes a riding seat on said frame.

7. A toy in the form of a partial tracked vehicle containing a pair of tracks which turn in a manner which simulates a partial tracked vehicle, said vehicle containing a frame, with said frame supporting tricycle means mounted on said frame, said tricycle means including a pedal actuated drive wheel located at one end of said frame and a pair of auxiliary wheels in parallel relationship to each other located at the opposite end of said frame and adapted to be rotated in response to rotation of said drive wheel, steering means connected to said drive wheel and being adapted for turning said tricycle means in any direction thereby controlling the direction of said tracked vehicle, and idler means mounted on said frame between said drive wheel and said auxiliary wheel, with said tracks being affixed respectively to each of said auxiliary wheels and said idler means to allow for track movement in response to movement of said auxiliary wheels, with said idler means being positioned to maintain said tracks out of contact with the riding surface of said tracked vehicle at the idler end of said tracks.

8. The device of claim 6 in which said idler means comprise a pair of wheels mounted on opposite sides of said frame.

9. The device of claim 7 which further includes a riding seat on said frame.

10. The device of claim 7 which further includes an outer body secured to said frame.

11. A toy in the form of a tracked vehicle containing a pair of tracks which turn in a manner which simulates a full-sized tracked vehicle, said vehicle having a supporting frame, drive means mounted on said frame, said drive means including a pair of actuated drive wheels mounted at the forward end of said frame and a pair of auxiliary wheels in parallel relationship to each other mounted at the opposite end of said frame, steering means connected to said drive wheels for turning said drive means in any direction thereby controlling the direction of said tracked vehicle, and idler means mounted on said frame associated with each auxiliary wheel and positioned forward of said auxiliary wheels, each of said tracks being affixed respectively to one of said auxiliary wheels and said associated idler means to allow for track movement in response to movement of said auxiliary wheels, said idler means being positioned to maintain said tracks out of contact with the riding surface of said vehicle at the forward end of said frame.

* * * * *